(12) United States Patent
Altepeter

(10) Patent No.: US 10,905,043 B2
(45) Date of Patent: Feb. 2, 2021

(54) FLOW CONTROL SYSTEM

(71) Applicant: Daniel J. Altepeter, East Grand Forks, MN (US)

(72) Inventor: Daniel J. Altepeter, East Grand Forks, MN (US)

(*) Notice: Subject to any disclaimer, the term of this patent is extended or adjusted under 35 U.S.C. 154(b) by 241 days.

(21) Appl. No.: 15/877,153

(22) Filed: Jan. 22, 2018

(65) Prior Publication Data
US 2019/0223371 A1 Jul. 25, 2019

(51) Int. Cl.
*A01C 7/08* (2006.01)
*A01C 7/10* (2006.01)
*A01C 15/04* (2006.01)
*G01F 13/00* (2006.01)

(52) U.S. Cl.
CPC .............. *A01C 7/082* (2013.01); *A01C 7/088* (2013.01); *A01C 7/102* (2013.01); *A01C 15/04* (2013.01); *G01F 13/001* (2013.01)

(58) Field of Classification Search
CPC ......... A01C 7/081; A01C 7/082; A01C 7/088; A01C 7/102; A01C 7/06; A01C 15/12; A01C 15/124; A01C 15/006
See application file for complete search history.

(56) References Cited

U.S. PATENT DOCUMENTS

| | | | |
|---|---|---|---|
| 5,980,163 A | 11/1999 | Gregor | |
| 6,320,183 B1 | 11/2001 | Gregor | |
| 6,401,638 B1 | 6/2002 | Crabb | |
| 6,774,318 B2 | 8/2004 | Beal | |
| 7,104,207 B2 | 9/2006 | Wake | |
| 7,690,440 B2 | 4/2010 | Dean | |
| 8,141,504 B2* | 3/2012 | Dean | A01C 7/081 111/179 |
| 8,683,931 B1 | 4/2014 | Lafferty | |
| 8,726,820 B2 | 5/2014 | Wollenhaupt | |
| 9,578,800 B2 | 2/2017 | Beaujot | |
| 9,681,602 B2 | 6/2017 | Montag | |
| 10,485,158 B2* | 11/2019 | Roberge | A01C 7/06 |
| 2012/0174844 A1* | 7/2012 | Friggstad | A01C 7/125 111/175 |
| 2017/0196162 A1 | 7/2017 | Sheppard | |
| 2019/0003600 A1* | 1/2019 | Reich | A01C 7/088 |

* cited by examiner

*Primary Examiner* — Alicia Torres
(74) *Attorney, Agent, or Firm* — Neustel Law Offices

(57) ABSTRACT

A flow control system for controlling flow of materials such as seeds or fertilizer as the materials are fed into a manifold and meter unit of an air seeder. The flow control system generally includes a flow controller which is connected between a volume of materials, such as a tank, and a manifold of an air seeder. The flow controller is adapted to control flow of the materials into the manifold to be metered by a meter unit. The flow controller includes a plurality of movable gates; with each gate being adapted to selectively open or close a corresponding opening in the flow controller. The gates may be manually adjusted, such as by a handle, or may be automatically adjusted, such as by actuators. By selectively opening or closing various gates, the volume and speed of flow of materials into the manifold may be easily and efficiently adjusted.

5 Claims, 21 Drawing Sheets

FLOW CONTROL SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a flow control system for controlling flow of materials such as seeds or fertilizer as the materials are fed into a meter unit of an air seeder.

Related Art

Any discussion of the related art throughout the specification should in no way be considered as an admission that such related art is widely known or forms part of common general knowledge in the field.

Air seeders are widely used in agriculture to handle bulk quantities of seed and fertilizer. Such air seeders will typically allow such bulk quantities of seed and fertilizer to both be mixed and distributed for planting; often across large acreages. The air seeders may be towed by a separate vehicle, or may be integral with a vehicle.

In the past, tanks of materials such as seeds or fertilizers have continuously fed into a manifold and meter unit which conveys the seeds and/or fertilizers through conduits to a distributer such as a disc planter using air pressure. Previously, there have been few options for controlling flow of the materials into the meter unit, which can lead to damage or inefficiencies in some circumstances. For example, flow control may be utilized to avoid meter overlap.

SUMMARY

An example embodiment is directed to a flow control system. The flow control system includes a flow controller which is connected between a volume of materials, such as a tank, and a manifold of an air seeder. The flow controller is adapted to control flow of the materials into the manifold to be metered by a meter unit. The flow controller includes a plurality of movable gates; with each gate being adapted to selectively open or close a corresponding opening in the flow controller. The gates may be manually adjusted, such as by a handle, or may be automatically adjusted, such as by actuators. By selectively opening or closing various gates, the volume, speed of flow, and distribution of materials into the manifold may be easily and efficiently adjusted.

There has thus been outlined, rather broadly, some of the embodiments of the flow control system in order that the detailed description thereof may be better understood, and in order that the present contribution to the art may be better appreciated. There are additional embodiments of the flow control system that will be described hereinafter and that will form the subject matter of the claims appended hereto. In this respect, before explaining at least one embodiment of the flow control system in detail, it is to be understood that the flow control system is not limited in its application to the details of construction or to the arrangements of the components set forth in the following description or illustrated in the drawings. The flow control system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1:
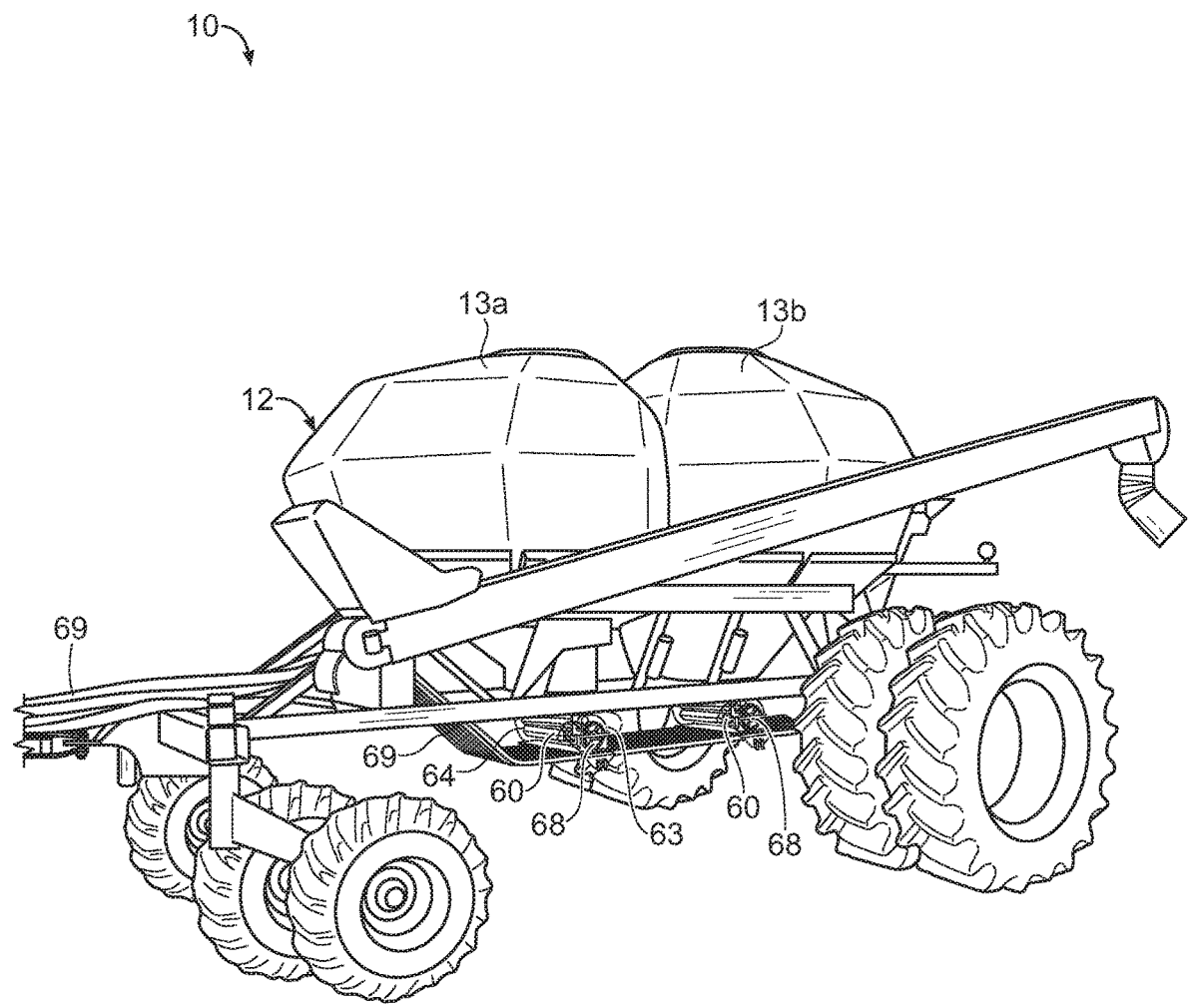
FIG. 1 is a perspective view of a flow control system in use with an air seeder in accordance with an example embodiment.

An example flow control system generally comprises a manifold 60 including an inlet 65 and an outlet 66. The inlet 65 of the manifold 60 is adapted to be fluidly connected to a volume of a material, such as within a tank 13. The outlet 66 of the manifold 60 is adapted to be fluidly connected to one or more distributors 18 such that the material may be distributed. A flow controller 30 may be connected to the manifold 60 so as to control a flow of the material entering the inlet 65 of the manifold 60. The flow controller 30 may comprise a plurality of openings 32 which are fluidly connected with the inlet 65 of the manifold 60. The material may comprise liquids or solids, such as fertilizer or seeds.

A plurality of gates 36 may be movably connected to the flow controller 30 so as to selectively cover one or more of the openings 32 of the flow controller 30. Each of the plurality of gates 36 may be adapted to selectively restrict flow of the material into the inlet 65 of the manifold 60. The manifold 60 may comprise a meter unit 68 which meters the materials within the manifold 60. A hopper may be connected between the inlet 65 of the manifold 60 and the volume of the material so as to direct the material into the inlet 65 of the manifold 60.

In an exemplary embodiment, a plurality of actuators 52 may be provided for moving the plurality of gates 36; with each of the actuators 52 being connected to one or more of the plurality of gates 36. Movement of each of the plurality of gates 36 may be individually controlled by one or more of the actuators 52. The flow controller 30 may include an actuator support 50 extending outwardly from an upper end of the flow controller 30; with each of the actuators 52 being connected/mounted to the actuator support 50. The actuators 52 may comprise various configurations, including motorized, electrical, hydraulic, and gas-powered.

In another exemplary embodiment, the gates 36 may be manually adjusted. A plurality of adjusters 43 may be connected to the gates 36; with each gate 36 having its own adjuster 43. The adjusters 43 may be manually adjusted to move one of the gates 36. A cover 40 may be provided for the flow controller 30; with the cover 40 being connected to an upper end of the flow controller 30. The cover 40 may comprise a flange 48 including a plurality of lock slots 41. Each of the adjusters 43 may include a lock member 47 adapted to selectively engage with one of the lock slots 41 to removably lock each of the adjusters 43 in position.

In yet another exemplary embodiment, an air seeder 12 may be provided which includes a tank 13 for storing a material and one or more distributers 18 for distributing the material. The inlet 65 of the manifold 60 may be fluidly connected to the tank 13 while the outlet 66 of the manifold 60 may be fluidly connected to the one or more distributors 18, such as by a plurality of conduits 69.

It should be appreciated that all components of the flow control system 10 described herein may comprise various types of materials. In the past, manifolds 60 and the like have been made of corrosive materials which can reduce the effective lifetime of the manifolds 60 and meter units 68. In a preferred embodiment, the various components of the flow control system 10 may comprise corrosion resistant materials. However, it should be appreciated that the systems and methods described herein may utilize any type of material, including those which are prone to corrosion.

B. Air Seeder

As shown in FIG. 1, the systems and methods described herein may be utilized in combination with an air seeder 12. Air seeders 12 are known in the art for distributing seeds, fertilizer, and other materials evenly along a path of traverse of the air seeder 12.

It should be appreciated that the exemplary air seeder 12 shown in FIG. 1 is merely for illustrative purposes and should not be construed as limiting on the scope of the systems and methods described herein. The systems and methods described herein may be utilized with a wide range of air seeders 12, including the John Deere 1900 air cart, as well as other air seeders 12 known in the art.

An exemplary air seeder 12 may include one or more tanks 13 for storing one or more materials. The exemplary air seeder 12 shown in FIG. 1 includes a pair of tanks 13a, 13b; a first tank 13a which may store a material such as fertilizer and a second tank 13b which may store a material such as seed. The materials in the first tank 13a are mixed with the materials in the second tank 13b within the conduits 69 before being distributed by one or more distributors 18, such as disc or tine seeders.

C. Flow Controller

As shown throughout the figures, a flow controller 30 may be utilized to control flow of materials entering the manifold 60 from the tank 13. The flow controller 30 may be utilized to selectively inhibit flow of the materials from the tank 13 into the manifold 60 and meter unit 68. The flow controller 30 may be manually adjustable, such as shown in FIGS. 2-12, or may be automatically adjusted, such as shown in FIGS. 13-21.

In some embodiments, a mount plate 20 may be utilized to interconnect the flow controller 30 and the manifold 60. Such a mount plate 20 may be useful when connecting the flow controller 30 to the manifold 60; especially if the flow controller 30 is being connected to an OEM manifold 60. The shape, size, and configuration of the mount plate 20 may vary in different embodiments. Thus, the rectangular configuration shown in the figures should not be construed as limiting in scope. The shape and size of the mount plate 20 will vary to suit different types of air seeders 12 or manifolds 60.

Figure 4:
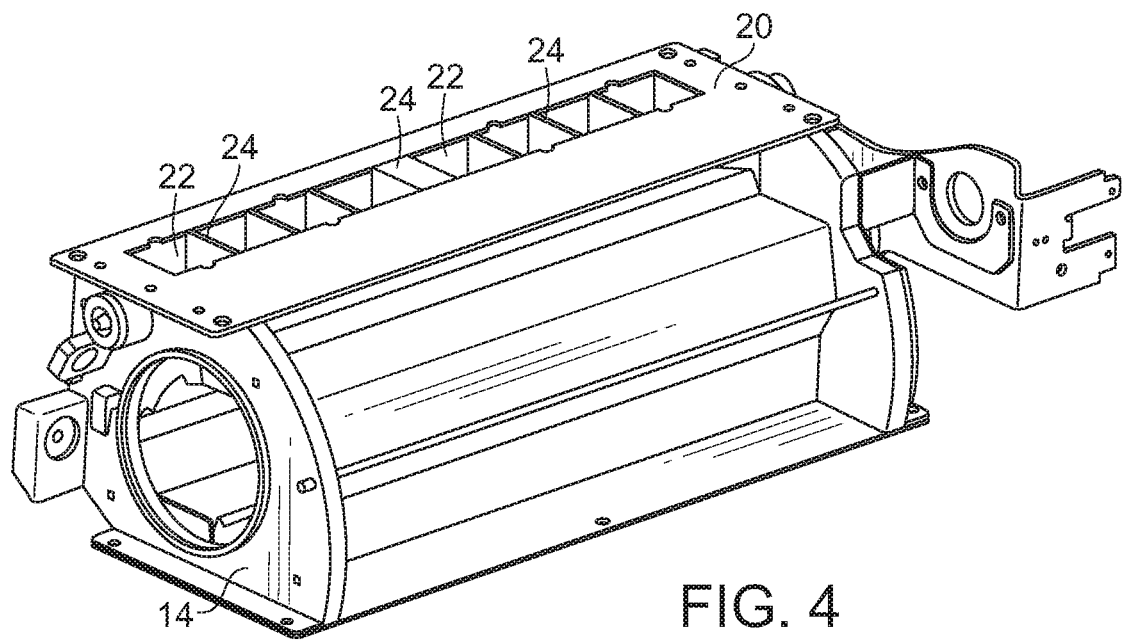
FIG. 4 is a perspective view of a manifold and mount plate of a flow control system in accordance with an example embodiment.

An exemplary mount plate 20 is shown in FIG. 4. As shown, the mount plate 20 may comprise a flat, rectangular plate having a plurality of openings 22 which are divided by a plurality of dividers 24. The number of openings 22 of the mount plate 20 may vary, but will preferably match the number of openings 32 on the flow controller 30. In some embodiments, the mount plate 20 may include a singular opening 22 which is divided into sections by the dividers 24. In other embodiments, the mount plate 20 may include a plurality of discrete openings 22.

The location to which the mount plate 20 is connected may also vary in different embodiments. The exemplary figures illustrate the mount plate 20 being connected to an upper end 61 of the manifold 60. This positioning may vary in different embodiments, such as with manifolds 60 that do not have an inlet 65 located at the upper end 61 thereof. In such embodiments, the mount plate 20 may be connected over the inlet 65. In some embodiments, the mount plate 20 may be omitted entirely; with the flow controller 30 being connected directly to the manifold 60.

Figure 2:
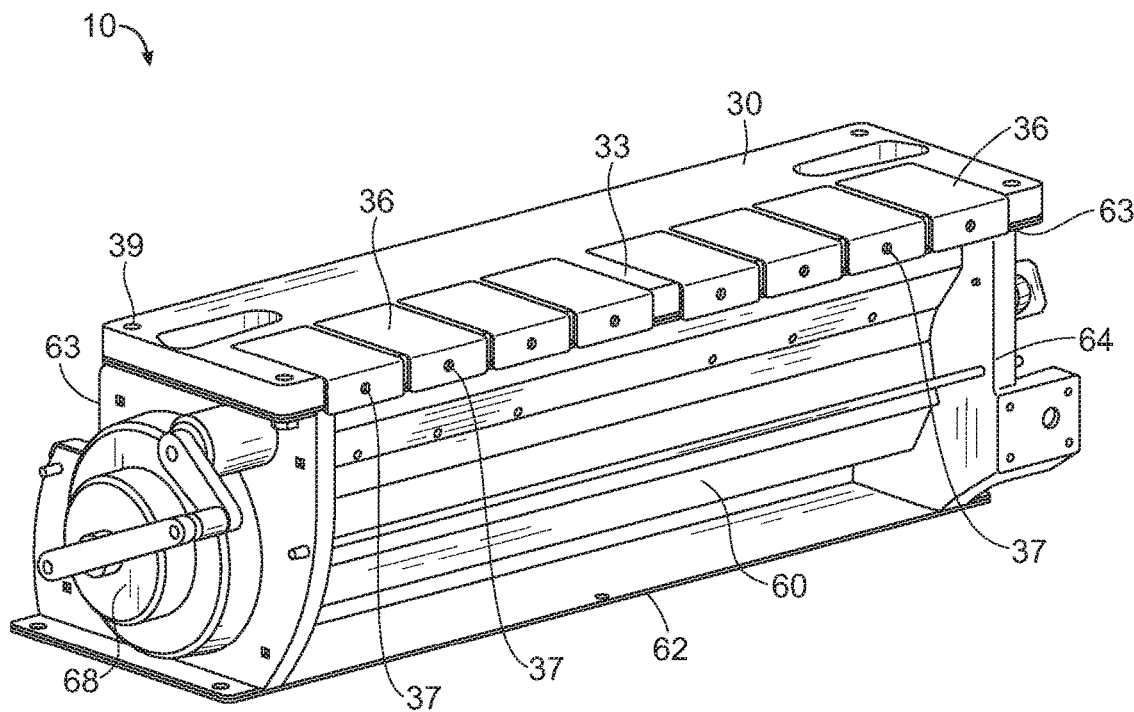
FIG. 2 is a perspective view of a flow control system in accordance with an example embodiment.
Figure 3:
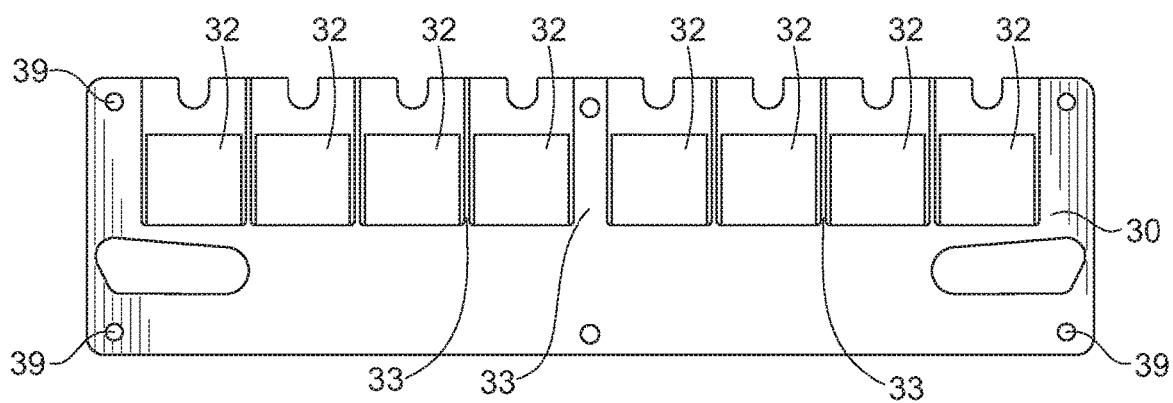
FIG. 3 is a top view of a flow controller of a flow control system in accordance with an example embodiment.

An exemplary flow controller 30 is shown in FIGS. 2 and 3. As shown in FIG. 2, the flow controller 30 may be connected to the upper end 61 of the manifold 60 above its inlet 65. The flow controller 30 may comprise a plurality of openings 32 through which the materials may flow. The openings 32 may include dividers 33 which divide the openings 32 into sections. In this manner, flow may be restricted but not entirely cut off for various purposes during use.

As shown in FIG. 3, the openings 32 may form a row extending across the face of the flow controller 30. The number of openings 32 may vary in different embodiments for different purposes. Additionally, the orientation of the openings 32 may vary in different embodiments. Thus, the openings 32 may not form a linear row as shown in FIG. 3 in some embodiments. In some embodiments, the openings 32 may not be linearly-aligned, but instead staggered. The positioning of the openings 32 will preferably match the overall shape of the inlet 65 of the manifold 60.

Figure 5:
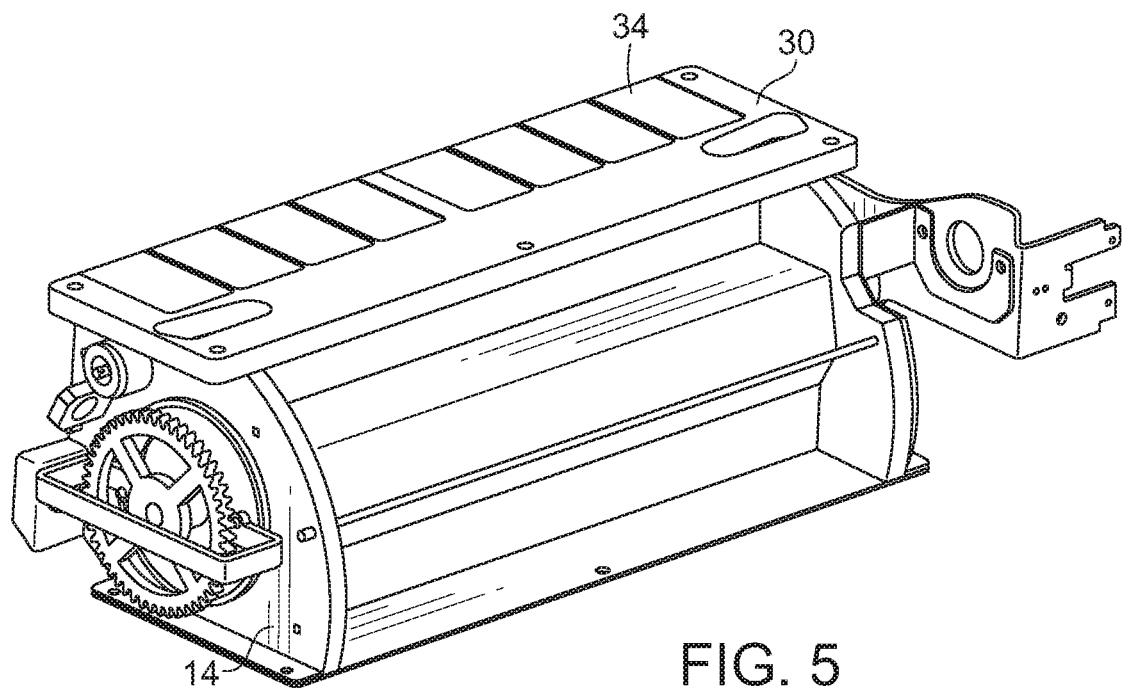
FIG. 5 is a perspective view of a flow control system in accordance with an example embodiment.

As shown in FIGS. 2 and 5, the flow controller 30 may include a plurality of gates 36 which are adapted to selectively cover the openings 32 of the flow controller 30. The gates 36 are preferably movably connected to the flow controller 30 such that each gate 36 may be advanced to cover a corresponding opening 32 on the flow controller 30, and retracted to expose the corresponding opening 32 on the flow controller 30. In this manner, flow of materials into the openings 32 on the flow controller 30 (and into the inlet 65 of the manifold 60) may be controlled by advancing and/or retracting various combinations of gates 36.

FIGS. 2 and 5 illustrate a manually-adjustable flow controller 30 with gates 36 that may be manually advanced to cover a corresponding opening 32, or retracted to expose the corresponding opening 32, such as by grasping the gates 36 directly and pulling them outwardly or pushing them inwardly. FIGS. 6-12 illustrate a manually-adjustable flow controller 30 with gates 36 that may be manually advanced to cover a corresponding opening 32, or retracted to expose the corresponding opening 32, such as by grasping adjusters 43 on each of the gates 36.

Figure 6:
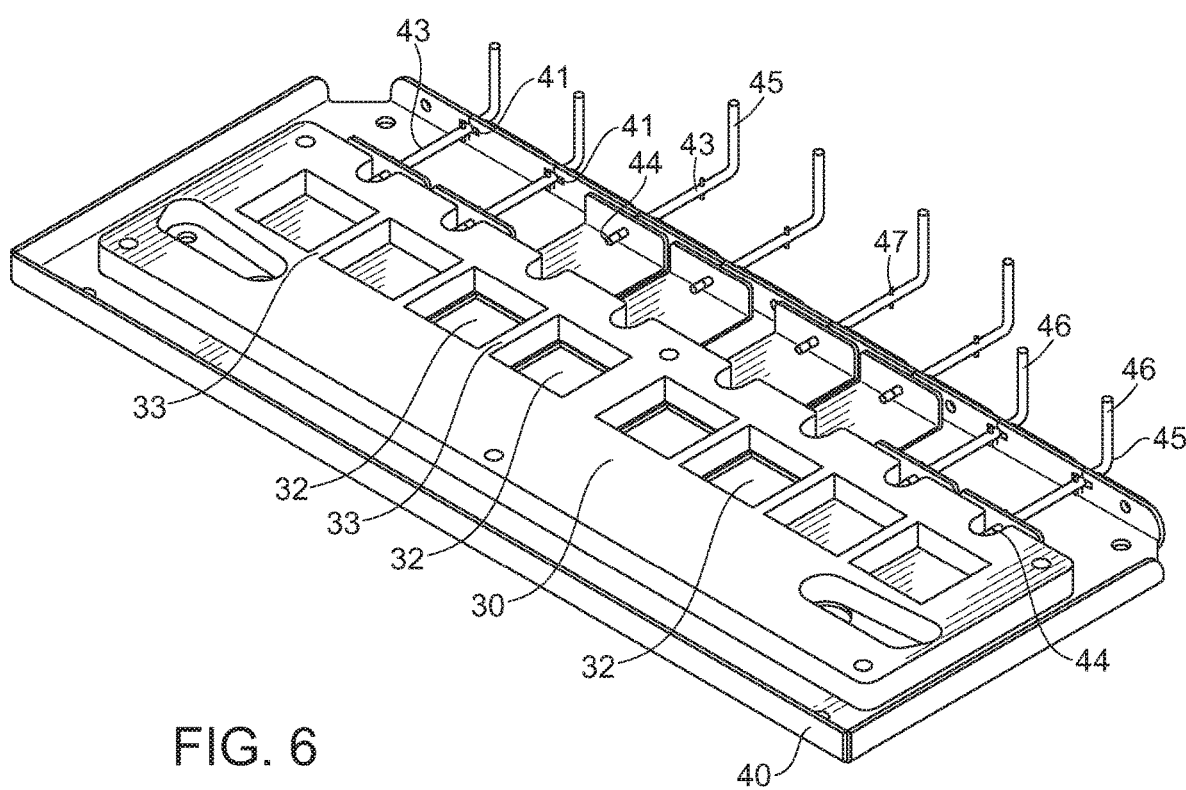
FIG. 6 is a bottom perspective view of a flow controller of a flow control system in accordance with an example embodiment.

As shown in FIG. 6, an exemplary embodiment of a flow controller 30 may utilize a plurality of adjusters 43 which may be utilized to manually adjust the gates 36 to selectively cover or expose the openings 32. The adjusters 43 may comprise elongated members, such as rods or the like, and may include a handle 46 to aid in grasping the adjusters 43.

Figure 7:
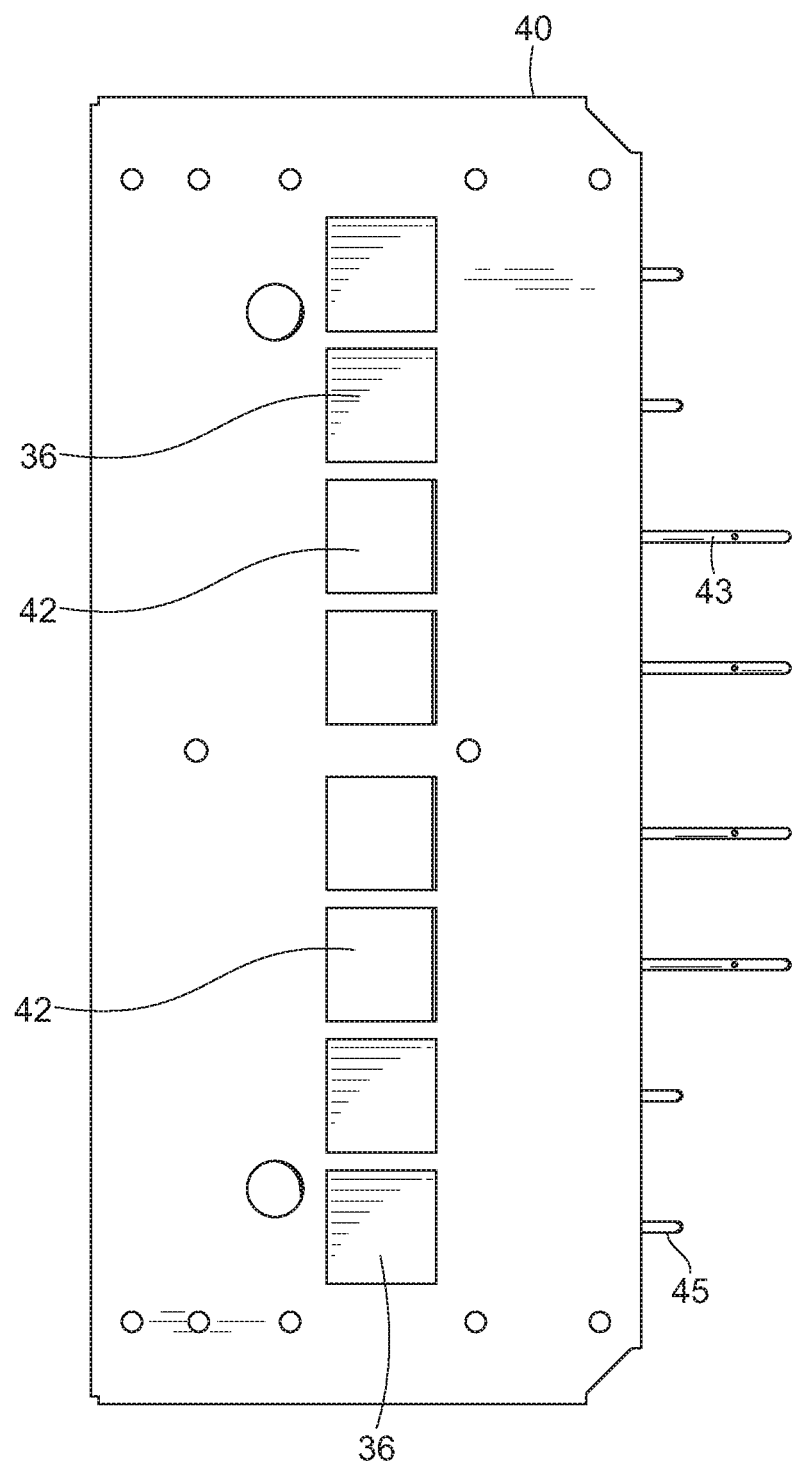
FIG. 7 is a top view of a flow controller of a flow control system in accordance with an example embodiment.

As shown in FIG. 7, a cover 40 may be utilized which is connected to the flow controller 30. The cover 40 may include a flange 48 having a plurality of lock slots 41 through which each adjuster 43 may be inserted. The cover 40 may be connected over the flow controller 30. The cover 40 may also include a plurality of openings 42 which correspond and are aligned with the underlying openings 32 in the flow controller 30. The manner in which the cover 40 is connected to the flow controller 30 may vary. In some embodiments, the cover 40 may be integral with the flow controller 30.

Each adjuster 43 may include a lock member 47 which is adapted to selectively engage with a corresponding lock slot 41 on the cover 40. The lock member 47 may comprise a projection which, when the adjuster 43 is rotated to a first position, allows the adjuster 43 to be pulled or pushed through the lock slot 41. When the adjuster 43 is rotated to a second position, the lock member 47 will be oriented so as not to pass through the lock slot 41. In this manner, the adjusters 43 (and thus the gates 36) may be selectively locked in a certain position.

The adjusters 43 are best shown in FIG. 6. As shown, each adjuster 43 may comprise a first end 44 which is connected to a gate 36 and a second end 45 which extends out of the lock slot 41 on the flange 48 of the cover 40. The second end 45 of each adjuster 43 may include a handle 46. In the exemplary figures, the handle 46 is formed by bending the adjuster 43 at a 90 degree angle at its second end 45.

Other forms of handles 46 may be utilized, such as a T-shaped configuration or a knob. The handle 46 may be utilized both to rotate the adjusters 43 so as to lock or unlock the adjusters 43, and to advance/retract the adjusters 43. The lock member 47 on each adjuster 43 may selectively engage with the lock slot 41 to lock the adjuster 43 in its desired position until it is rotated again in a reverse direction to disengage the lock member 47 from the lock slot 41 and allow the adjuster 43 to be moved.

The gates 36 will each preferably be slidably connected between the cover 40 and the flow controller 30. Thus, when engaged to cover the openings 32 of the flow controller 30, a gate 36 will be sandwiched between the openings 42 of the cover 40 and the openings 32 of the flow controller 30. The dividers 33 of the flow controller 30 may serve as tracks within which the gates 36 may be advanced or retracted.

It should be appreciated that the various gates 36 may be individually controlled to control the flow of the materials into the manifold 60. FIGS. 8-11 illustrate exemplary configurations of the various gates 36. These are merely exemplary illustrations and should not be construed as limiting.

Figure 8:
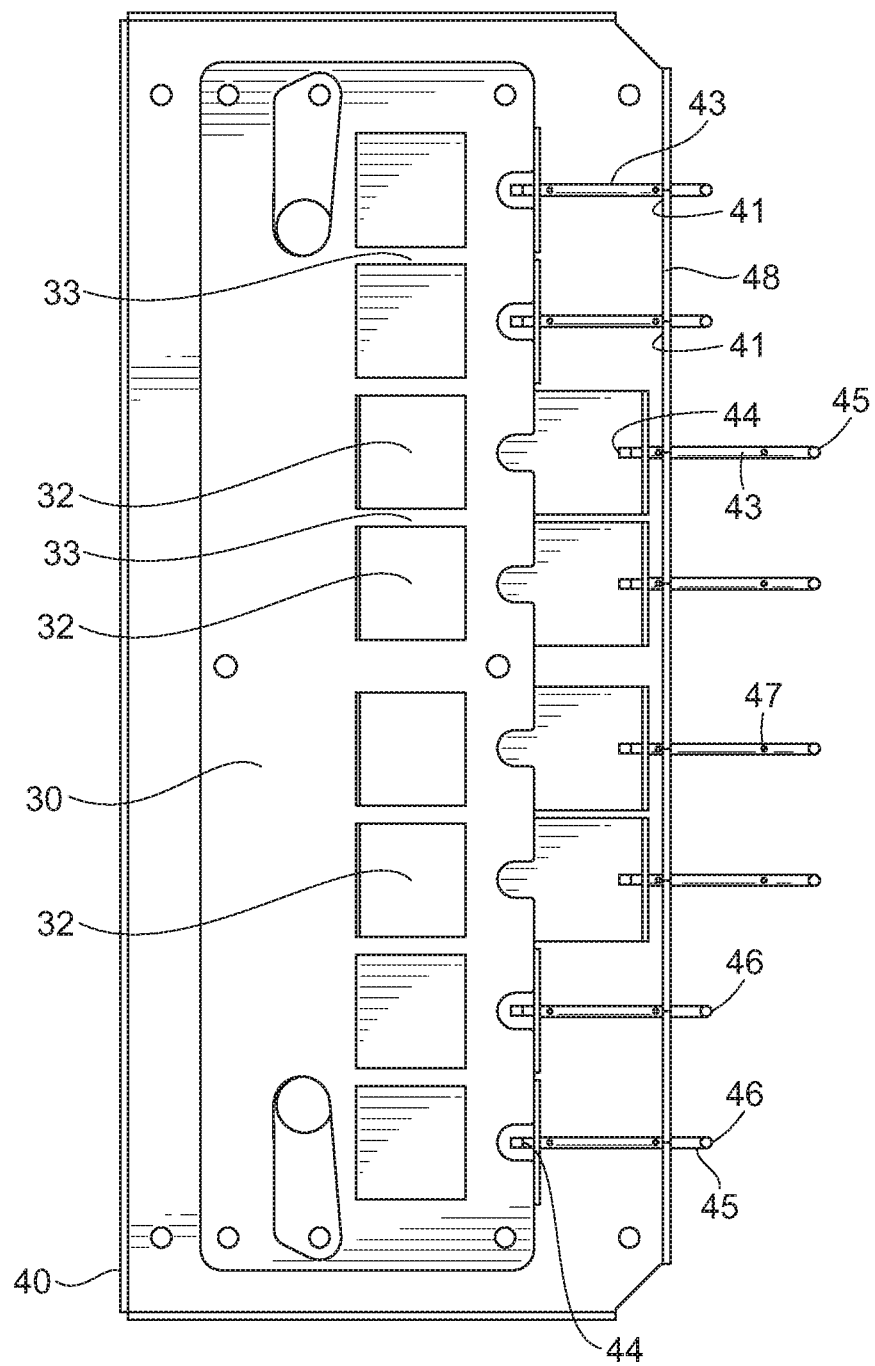
FIG. 8 is a bottom view of a flow controller of a flow control system in accordance with an example embodiment with a first arrangement of opened/closed gates.

In FIG. 8, it can be seen that the outer four openings 32 of the flow controller 30 are closed by pushing in the outer four adjusters 43 to cover the openings 32 of the flow controller 30 with the outer four gates 36. The inner four openings 32 of the flow controller 30 are opened by pulling out the inner four adjusters 43 to expose the openings 32 of the flow controller 30 with the inner four gates 36.

Figure 9:
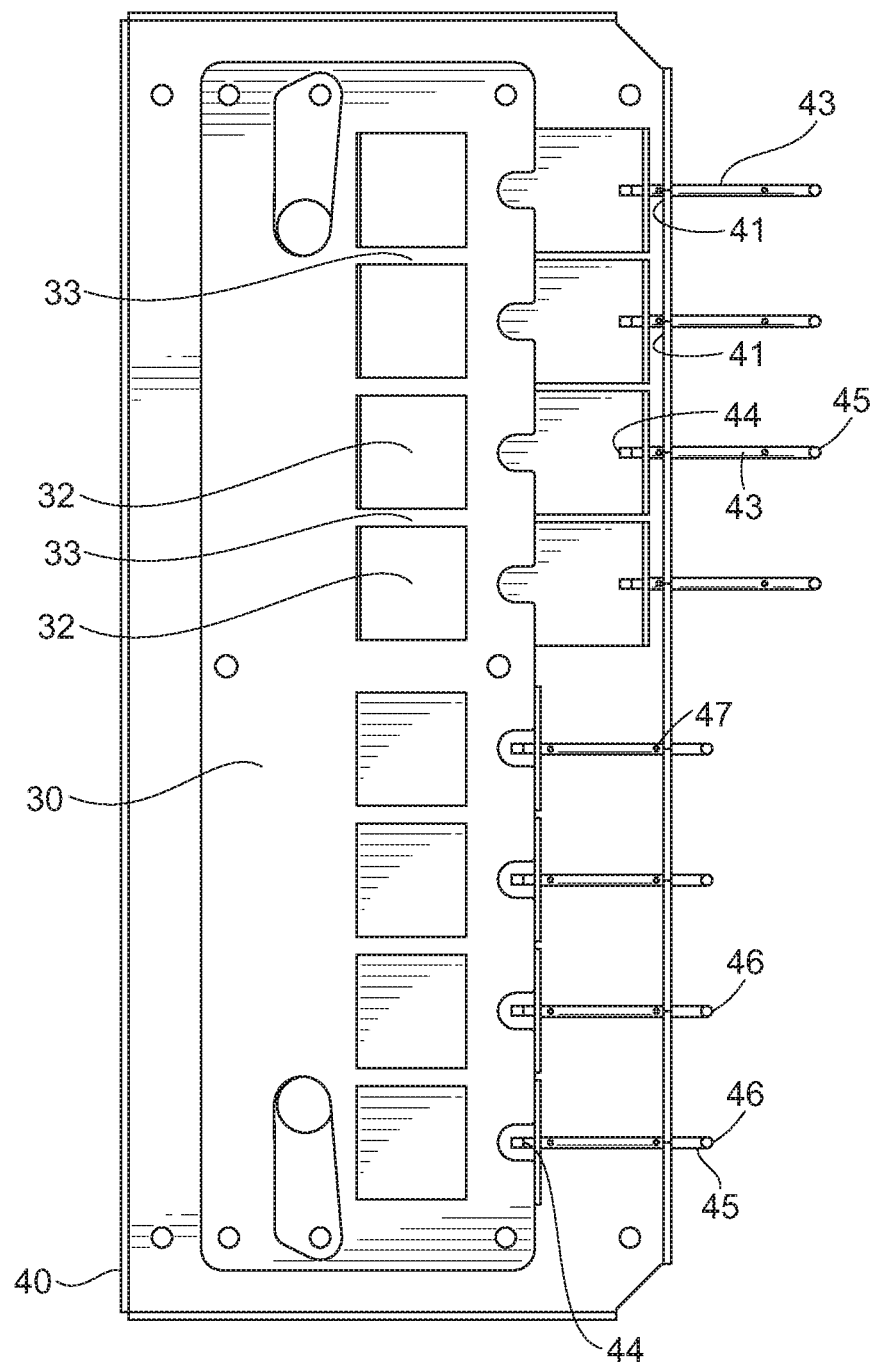
FIG. 9 is a bottom view of a flow controller of a flow control system in accordance with an example embodiment with a second arrangement of opened/closed gates.

In FIG. 9, it can be seen that the first four openings 32 of the flow controller 30 are opened by pulling out the first four adjusters 43 to expose the openings 32 of the flow controller 30 with the first four gates 36. The second four openings 32 of the flow controller 30 are closed by pushing in the second four adjusters 43 to cover the openings 32 of the flow controller 30 with the second four gates 36.

Figure 10:
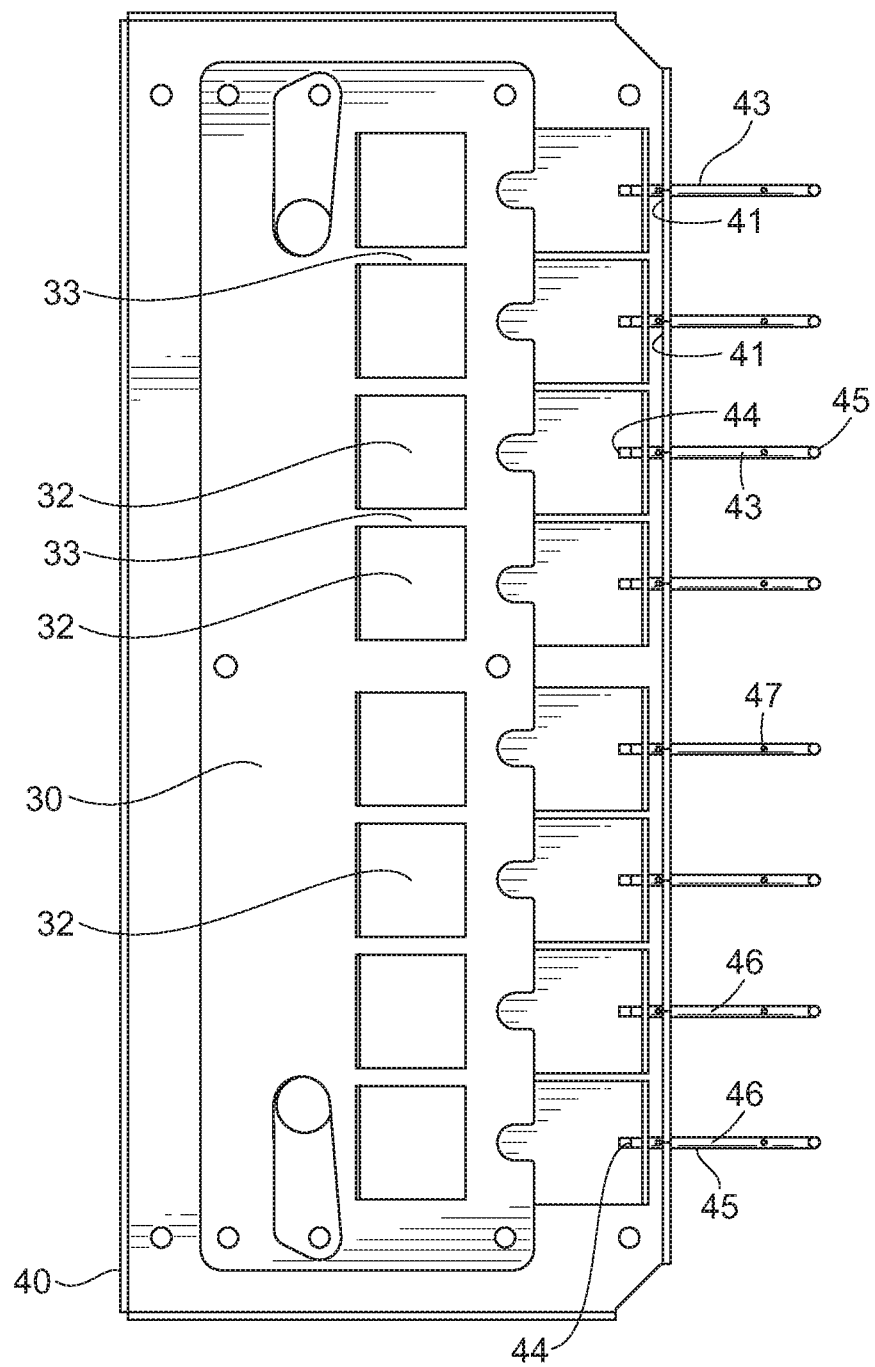
FIG. 10 is a bottom view of a flow controller of a flow control system in accordance with an example embodiment with a third arrangement of opened/closed gates.

In FIG. 10, it can be seen that all eight gates 36 have been pulled back via their adjusters 43 such that all openings 32 of the flow controller 30 are exposed. Such a configuration will allow maximum flow of materials into the manifold 60. Although not shown, the reverse configuration may be utilized to completely stop flow of materials into the manifold 60.

Figure 11:
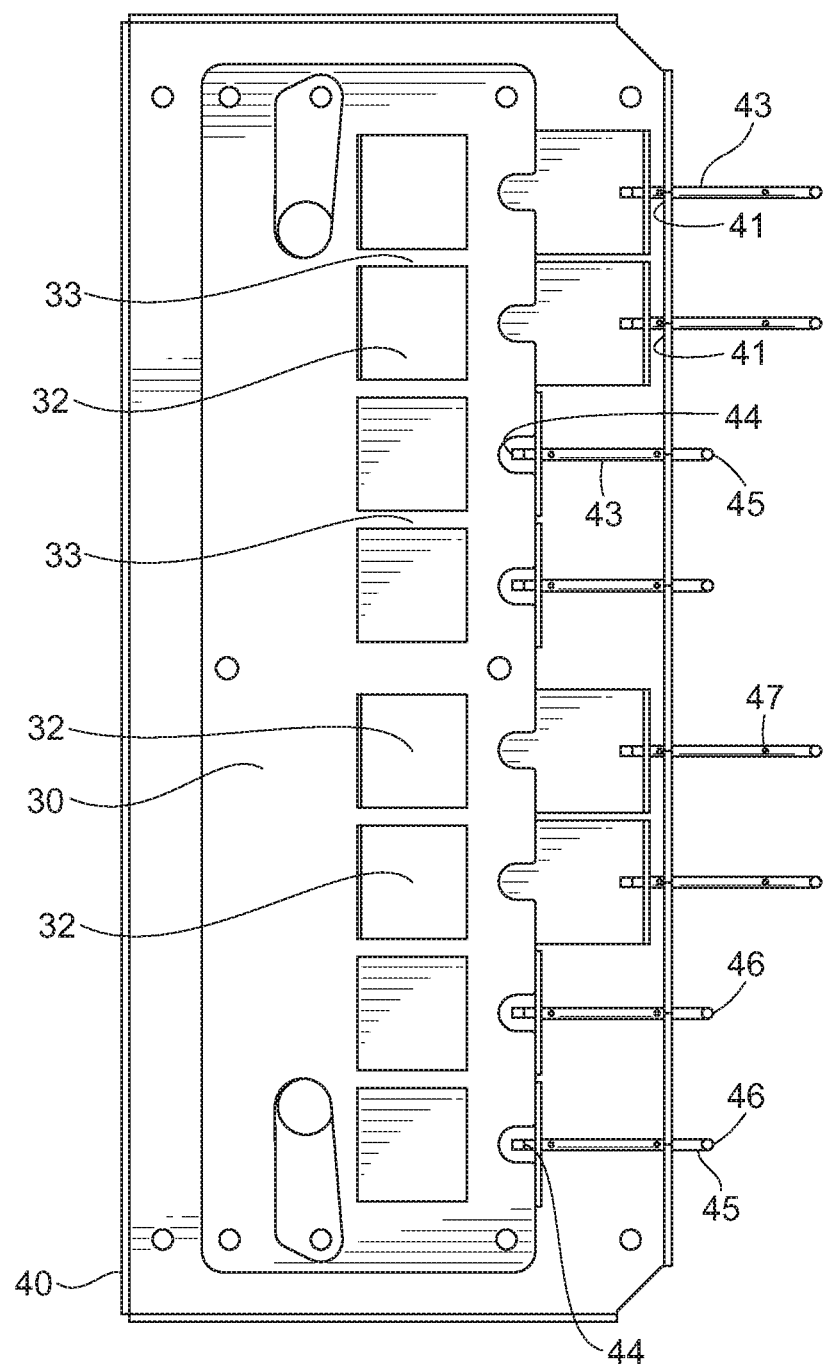
FIG. 11 is a bottom view of a flow controller of a flow control system in accordance with an example embodiment with a fourth arrangement of opened/closed gates.

In FIG. 11, it can be seen that the first two gates 36 are disengaged, the next two gates 36 are engaged, the next two gates 36 are disengaged, and the next two gates 36 are engaged. It should be appreciated that the exemplary views in FIGS. 8-11 are merely for illustrative purposes and are not meant to be limiting with respect to combinations of open/closed gates 36. Various other configurations and combinations of open/closed gates 36 may be utilized to control flow of materials into the manifold 60.

Figure 12:
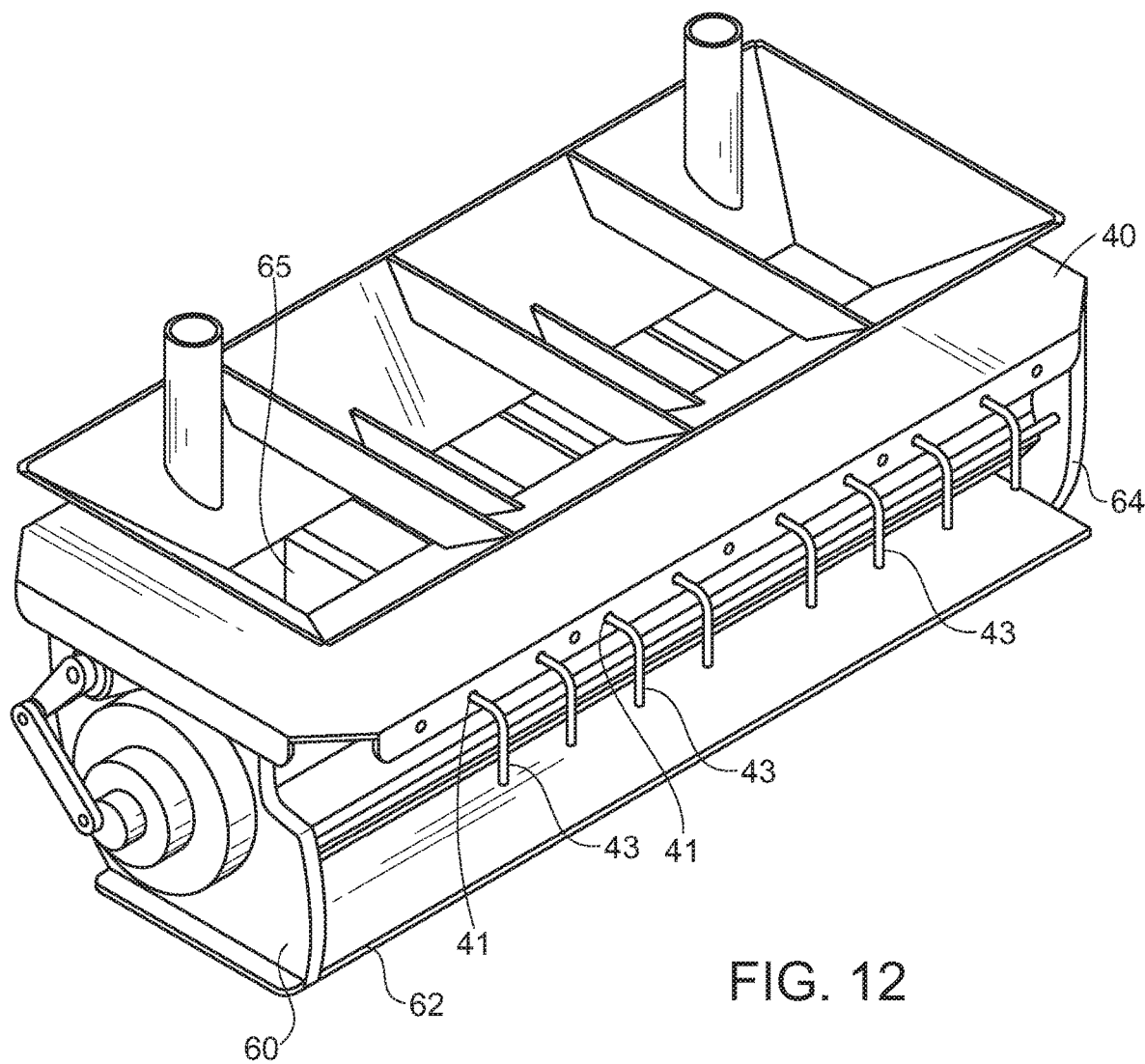
FIG. 12 is a perspective view of a flow control system utilizing a hopper in accordance with an example embodiment.

As shown in FIG. 12, a hopper 70 may be utilized in some embodiments. The hopper 70 may be connected between the flow controller 30 and the volume of material such as a tank 13. In the exemplary embodiment shown in FIG. 12, the hopper 70 is connected above the openings 32 of the flow controller 30 so as to direct materials into the openings 32.

Figure 13:
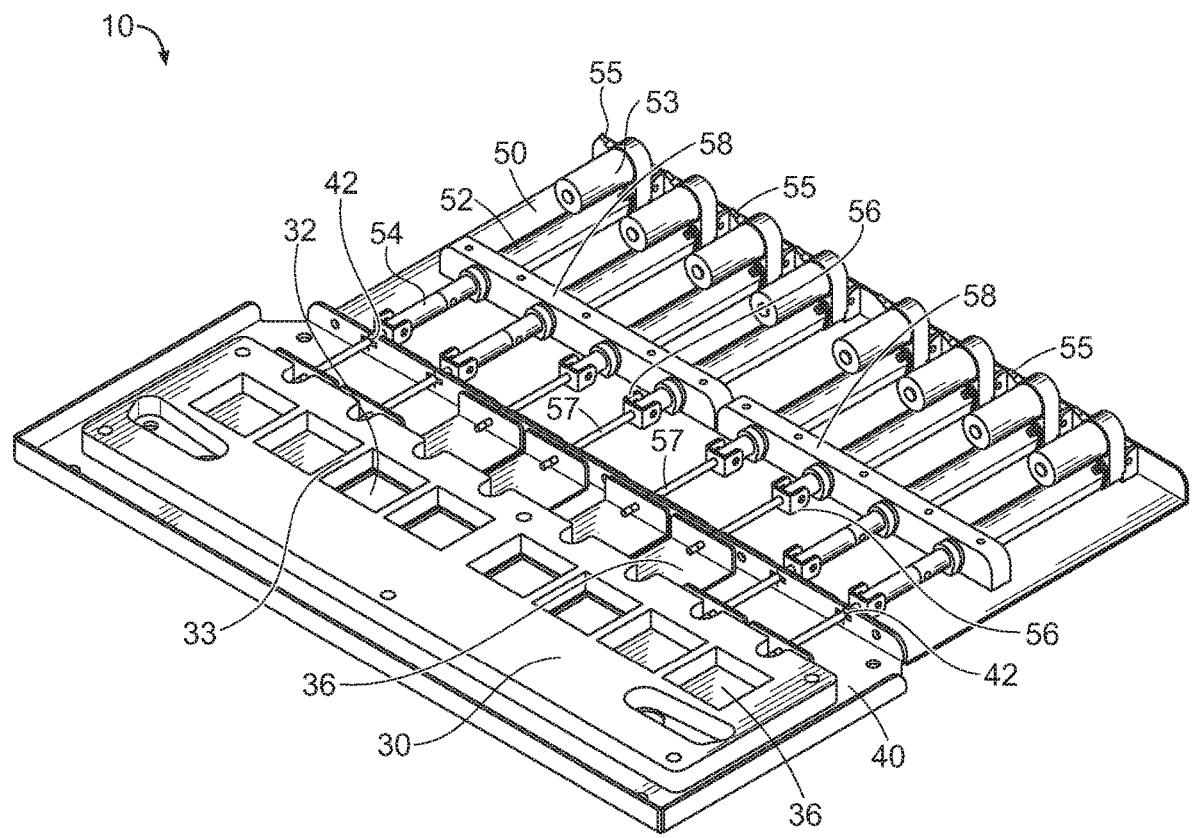
FIG. 13 is a bottom perspective view of a flow controller utilizing actuators in accordance with an example embodiment.

FIGS. 13-21 illustrate an exemplary embodiment of a flow controller 30 which has automatically-adjustable gates 36. As shown in FIG. 13, such an embodiment may utilize a plurality of actuators 52 which are adapted to control one or more gates 36. In the exemplary embodiment of FIG. 13, each gate 36 has its own corresponding actuator 52. It should be appreciated that, in some embodiments, multiple gates 36 may be controlled by a single actuator 52.

Various types of actuators 52 may be utilized in different embodiments. Although the figures illustrate the use of linear actuators 52, it should be appreciated that other configurations may be utilized. The actuators 52 may be motorized and may comprise hydraulic, electric, or gas-powered actuators 52. Generally, each actuator 52 will include a base 53 and a shaft 54 which is movable with respect to the base 53. In some embodiments, the actuators 52 may include ports 55 for hydraulic or electrical connections.

As shown in FIG. 13, the shaft 54 of each actuator 52 may be interconnected with a corresponding gate 36 by a linkage 57 such as a rod. In some embodiments, the shaft 54 of the actuator 52 may be directly connected to the gates 36. A clamp 56, which may be hinged, may be utilized to interconnect the shaft 54 with the linkage 57. In either case, extension of the shaft 54 from the base 53 will serve to push the gate 36 to cover the opening 32. Retraction of the shaft 54 into the base 53 will serve to pull the gate 36 to expose the opening 32.

Figure 14:
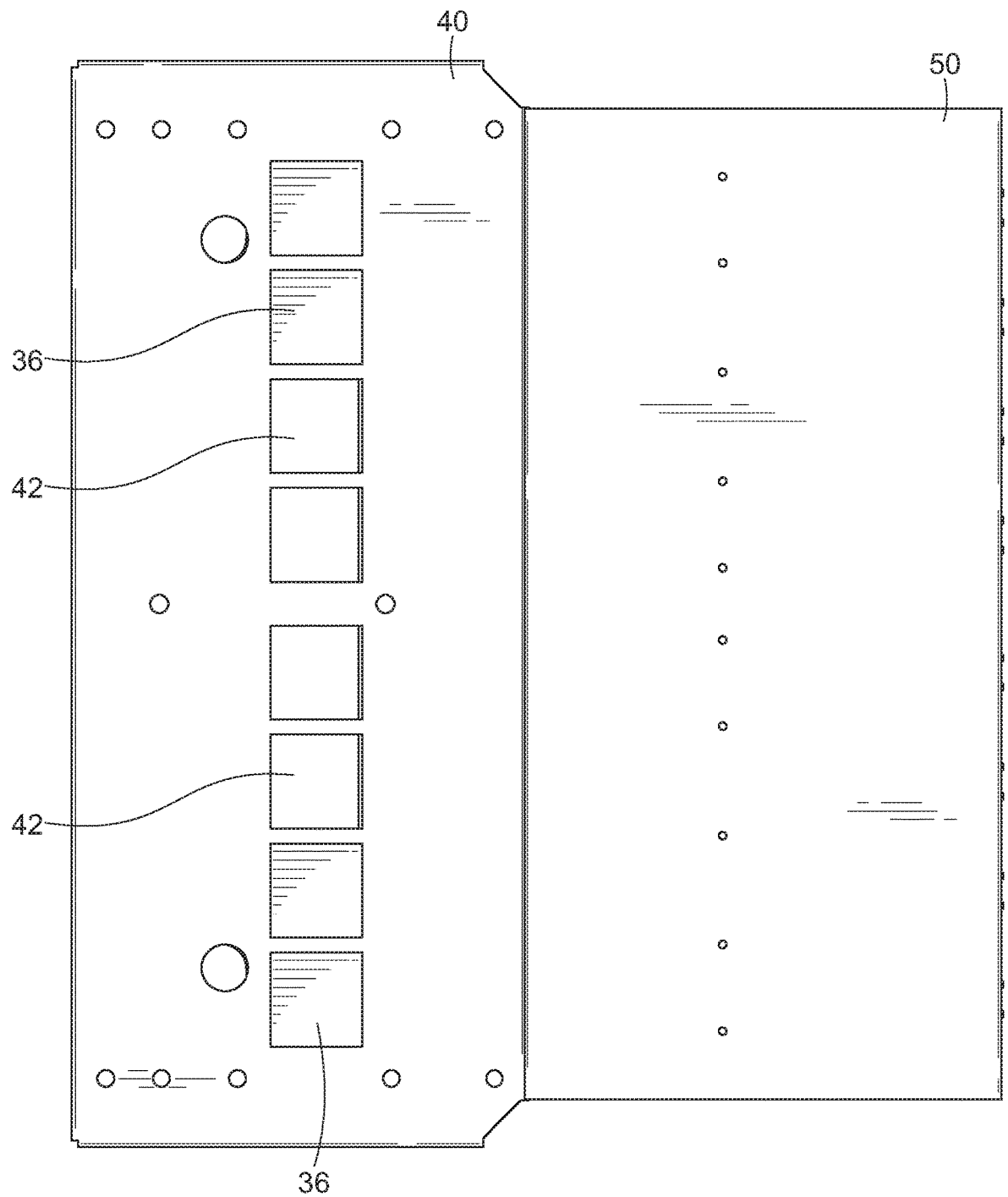
FIG. 14 is a top perspective view of a flow controller utilizing actuators in accordance with an example embodiment.
Figure 15:
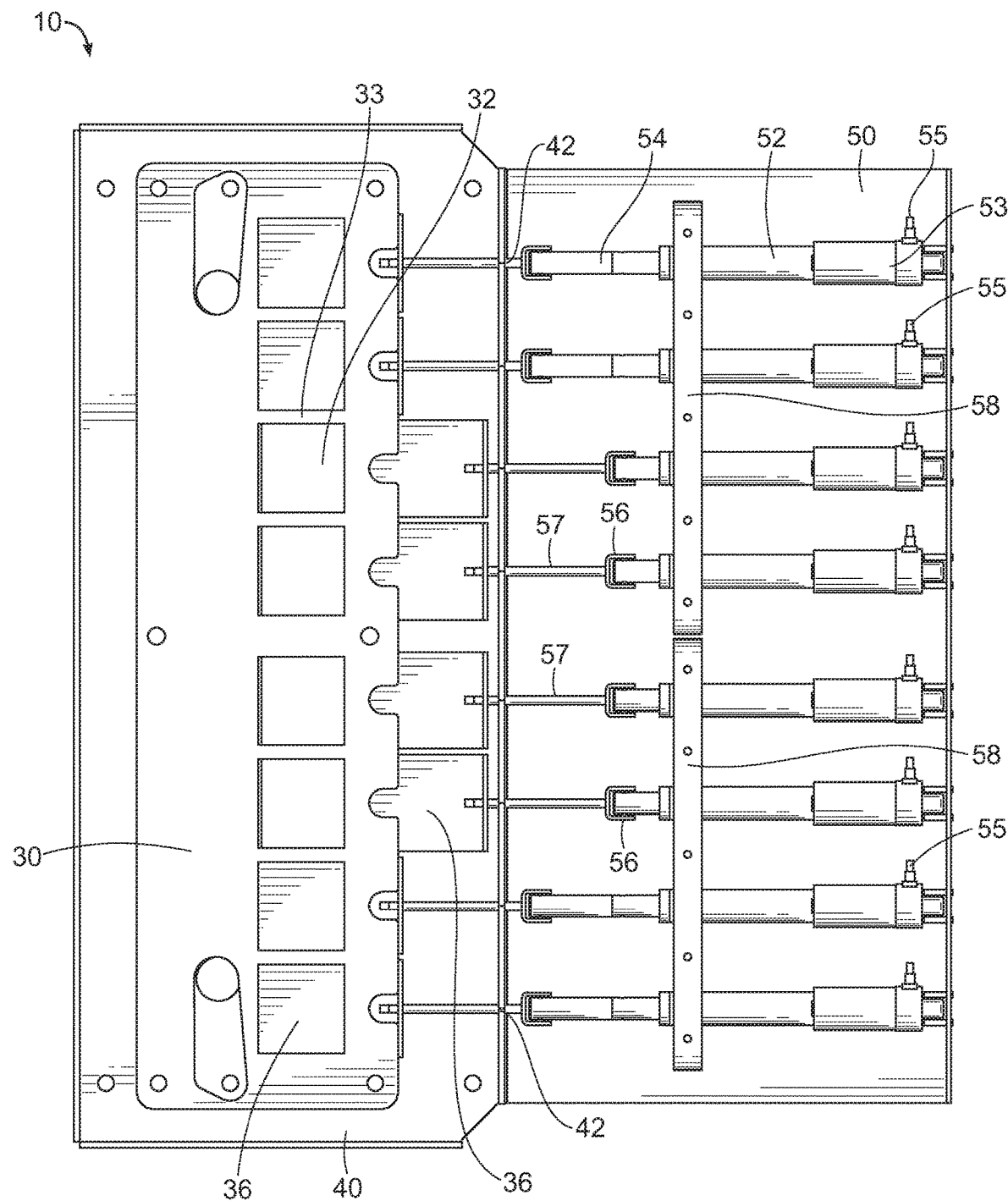
FIG. 15 is a bottom view of a flow controller utilizing actuators of a flow control system in accordance with an example embodiment with a first arrangement of opened/closed gates.

As best shown in FIG. 14, an actuator support 50 may extend outwardly from the flow controller 30; with the actuators 52 being mounted or connected to the actuator support 50. As shown in FIG. 15, retainers 58 may be utilized to secure the actuators 52 in aligned position to ensure that the actuators 52 do not become misaligned; which would impact operation of the gates 36. The retainers 58 may comprise rectangular members having openings through which the shafts 54 of each actuator 52 may pass through.

Although not shown, various types of controllers may be utilized to control operation of the actuators 52. The actuators 52 may be individually controllable so as to allow individual actuators 52 to be adjusted while others remain idle. The manner in which the actuators 52 are controlled may vary. There may be controls in the cabin of the vehicle towing the air seeder 12 in some embodiments. In other embodiments, the actuators 52 may be controlled by a mobile device, such as a smart phone or laptop computer.

FIGS. 15-18 illustrate various combinations of opened/closed gates 36 in an embodiment which utilizes actuators 52 to control the gates 36. In FIG. 15, it can be seen that the outer four actuators 52 are extended so as to cover the outer four openings 32 of the flow controller 30 with the outer four gates 36. The inner four actuators 52 are retracted so as to expose the inner four openings 32 by pulling back the inner four gates 36.

Figure 16:
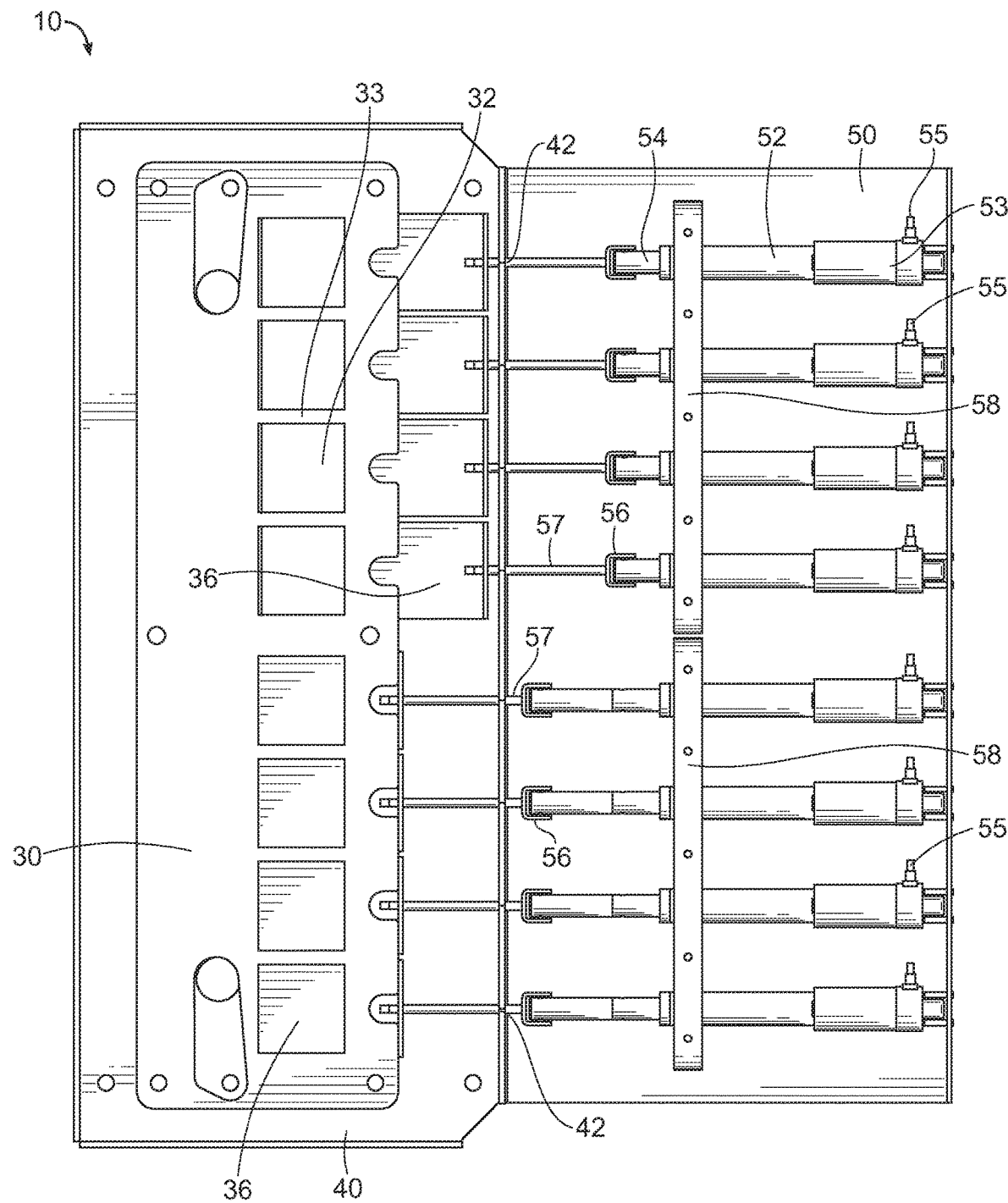
FIG. 16 is a bottom view of a flow controller utilizing actuators of a flow control system in accordance with an example embodiment with a second arrangement of opened/closed gates.

FIG. 16 illustrates another combination of opened/closed gates 36. As can be seen, the first four actuators 52 are retracted so as to expose the first four openings 32 of the flow controller 30. The second four actuators 52 are shown as extended so as to cover the second four openings 32 of the flow controller 30 with the second four gates 36.

Figure 17:
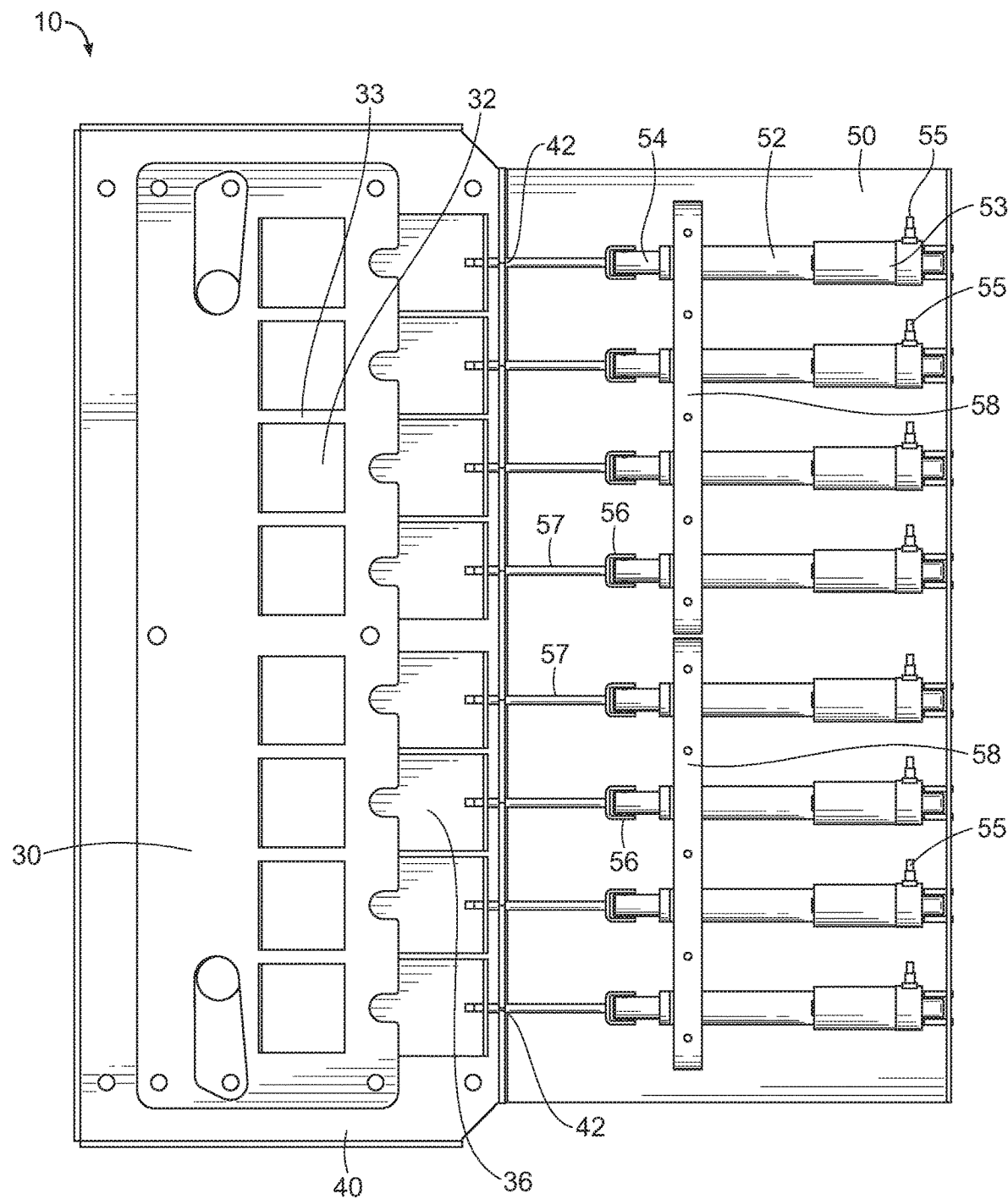
FIG. 17 is a bottom view of a flow controller utilizing actuators of a flow control system in accordance with an example embodiment with a third arrangement of opened/closed gates.

FIG. 17 illustrates a configuration in which all of the actuators 52 are retracted so as to expose all of the openings 32 of the flow controller 30 to allow maximum flow to the manifold 60. Although not shown, the reverse configuration may also be utilized to cover all of the openings 32 of the flow controller 30 to fully restrict flow to the manifold 60.

Figure 18:
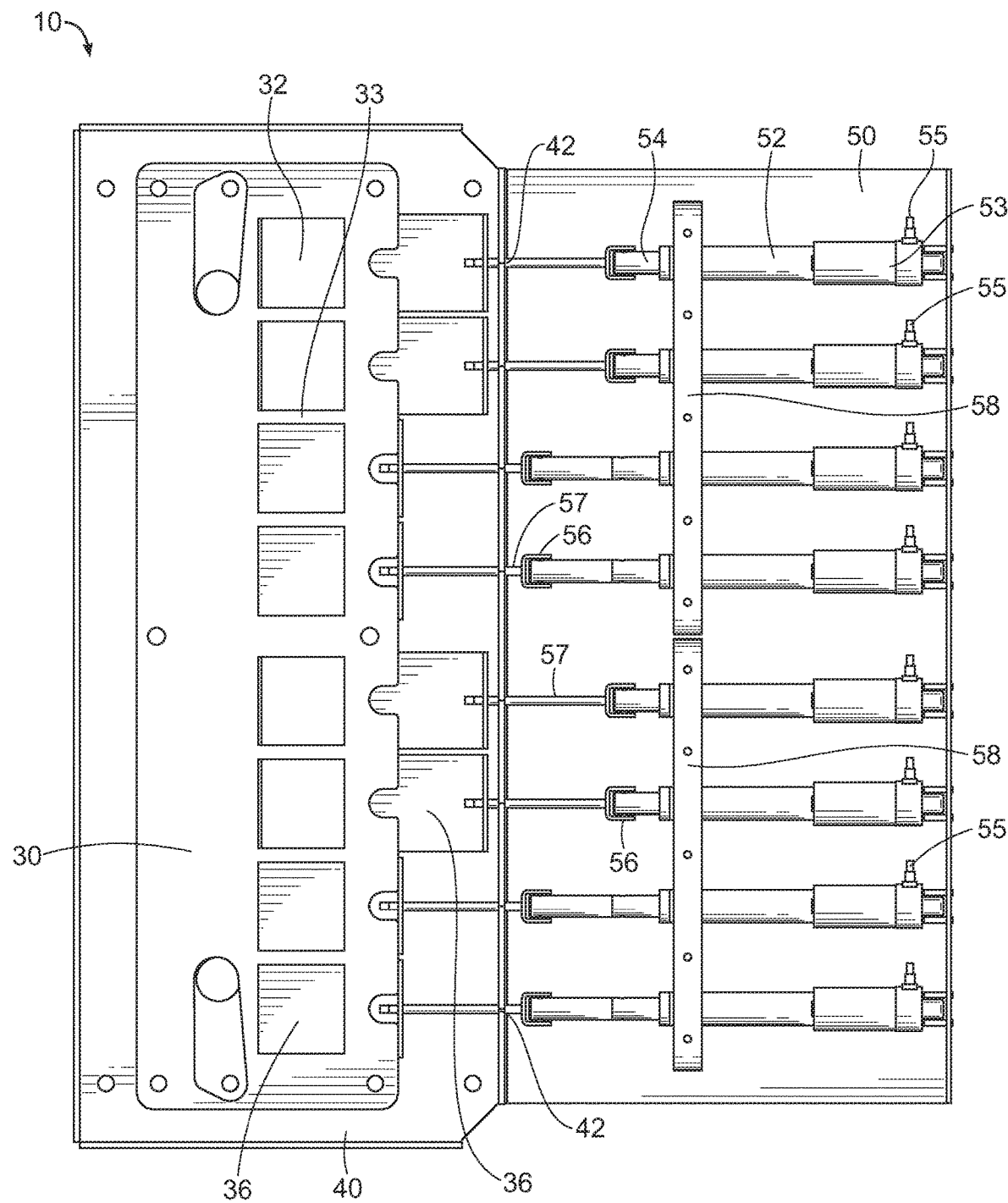
FIG. 18 is a bottom view of a flow controller utilizing actuators of a flow control system in accordance with an example embodiment with a fourth arrangement of opened/closed gates.

In FIG. 18, it can be seen that the first two gates 36 are disengaged, the next two gates 36 are engaged, the next two gates 36 are disengaged, and the next two gates 36 are engaged; all accomplished by extending or retracting the various actuators 52. It should be appreciated that the exemplary views in FIGS. 15-18 are merely for illustrative purposes and are not meant to be limiting with respect to combinations of open/closed gates 36. Various other configurations and combinations of open/closed gates 36 may be utilized to control flow of materials into the manifold 60.

D. Manifold

The flow control system 10 may include a manifold 60 which is utilized to distribute flow of materials from the tank 13 to the distributors 18. The manifold 60 is best shown in FIGS. 19, 20, 21, 23, and 24. Various types of manifolds 60 may be utilized. The manifold 60 could be installed with the flow controller 30 or, in some embodiments; the flow controller 30 may be affixed to an OEM manifold 60.

As shown in the figures, the manifold 60 may include an upper end 61, a lower end 62, a first end 63, and a second end 64. The upper end 61 of the manifold 60 is connected underneath the tank 13 or other volume of materials. The flow controller 30 may be connected to the upper end 61 of the manifold 60 so as to control flow of materials entering the inlet 65 of the manifold 60. Although the inlet 65 of the manifold 60 is illustrated as being on its upper end 61, alternate configurations may be utilized.

Figure 23:
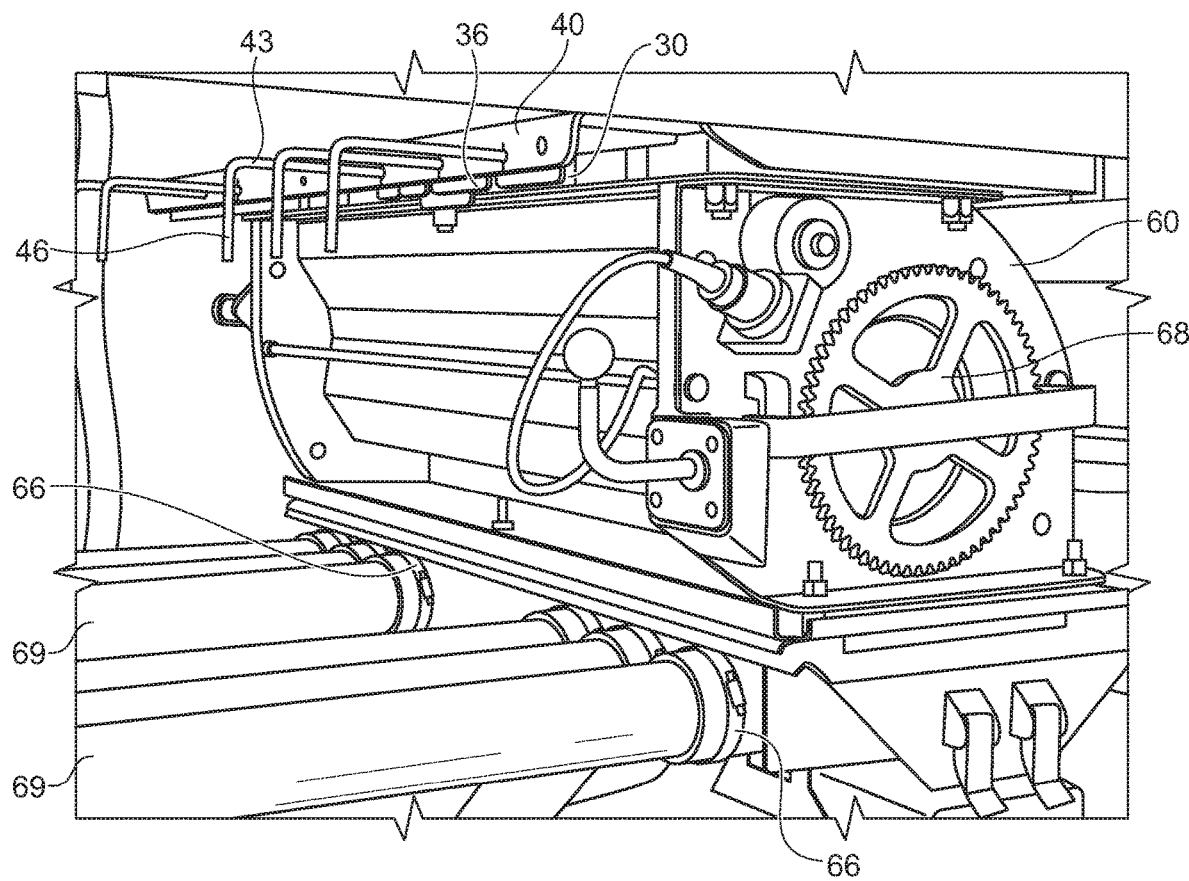
FIG. 23 is a perspective view of a flow control system installed on an air seeder in accordance with an example embodiment.
Figure 24:
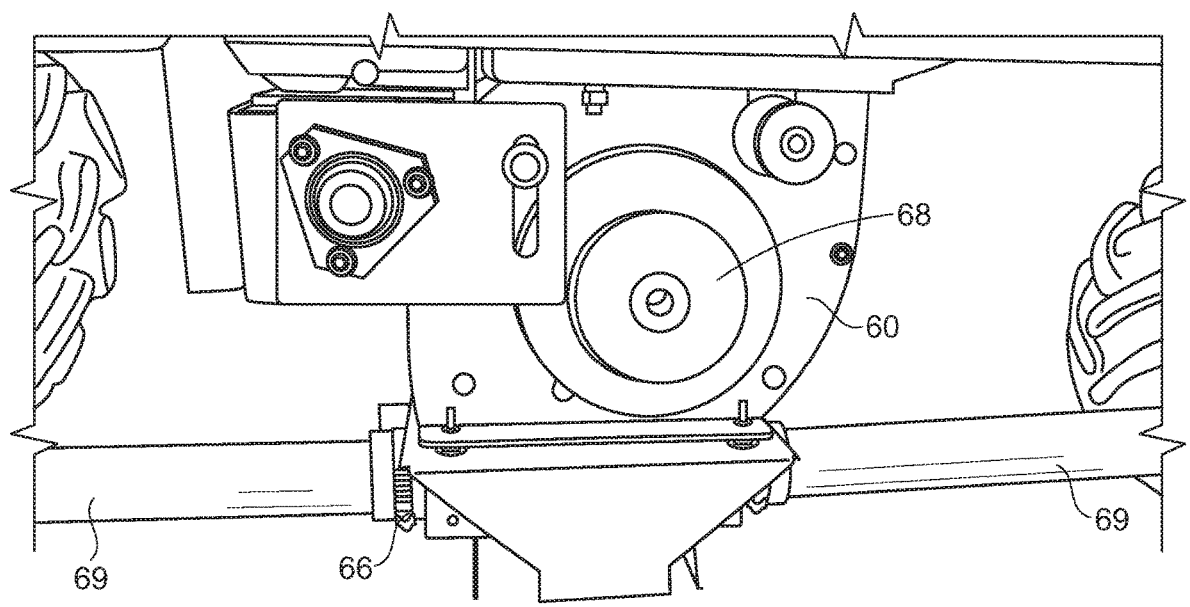
FIG. 24 is a side view of a flow control system installed on an air seeder in accordance with an example embodiment.

The outlet 66 of the manifold 60 will generally be at or near its lower end 62, though other placements may be utilized. The outlet 66 of the manifold 60 may be connected to a plurality of conduits 69 as shown in FIGS. 23 and 24. The configuration of the inlet 65 and outlet 66 of the manifold 60 may vary in different embodiments. In some embodiments, the manifold 60 may include multiple outlets 66 and only a single inlet 65. In other embodiments, multiple inlets 65 may be utilized.

Figure 19:
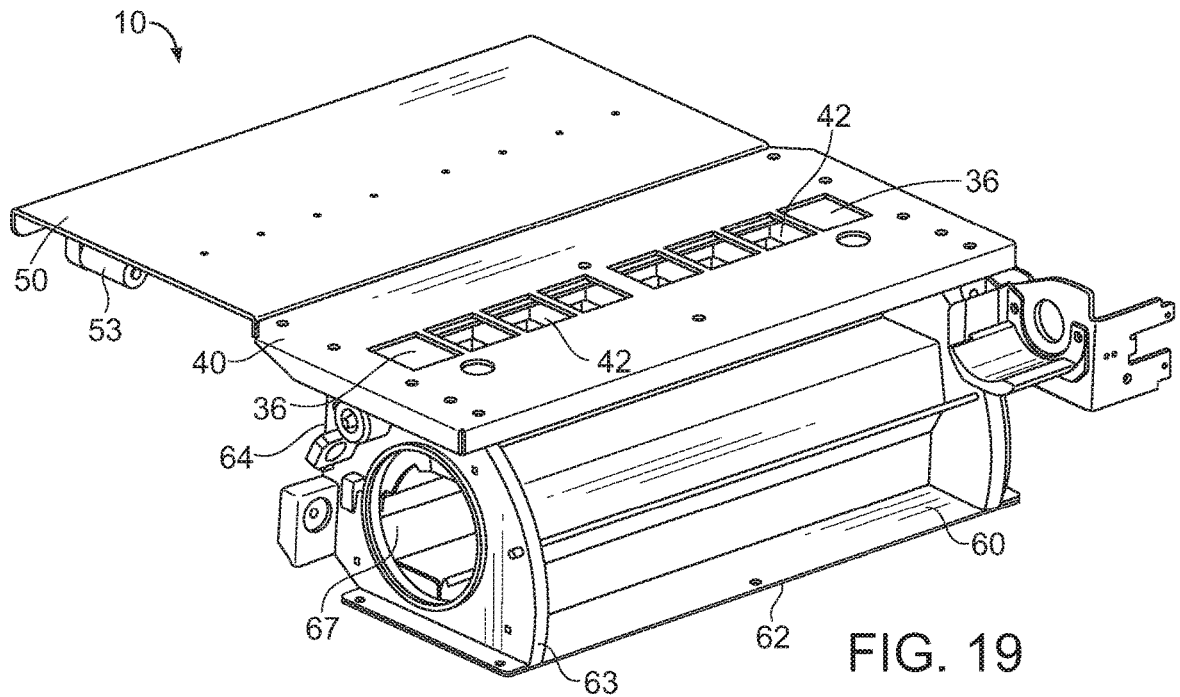
FIG. 19 is a perspective view of a flow control system in accordance with an example embodiment.
Figure 20:
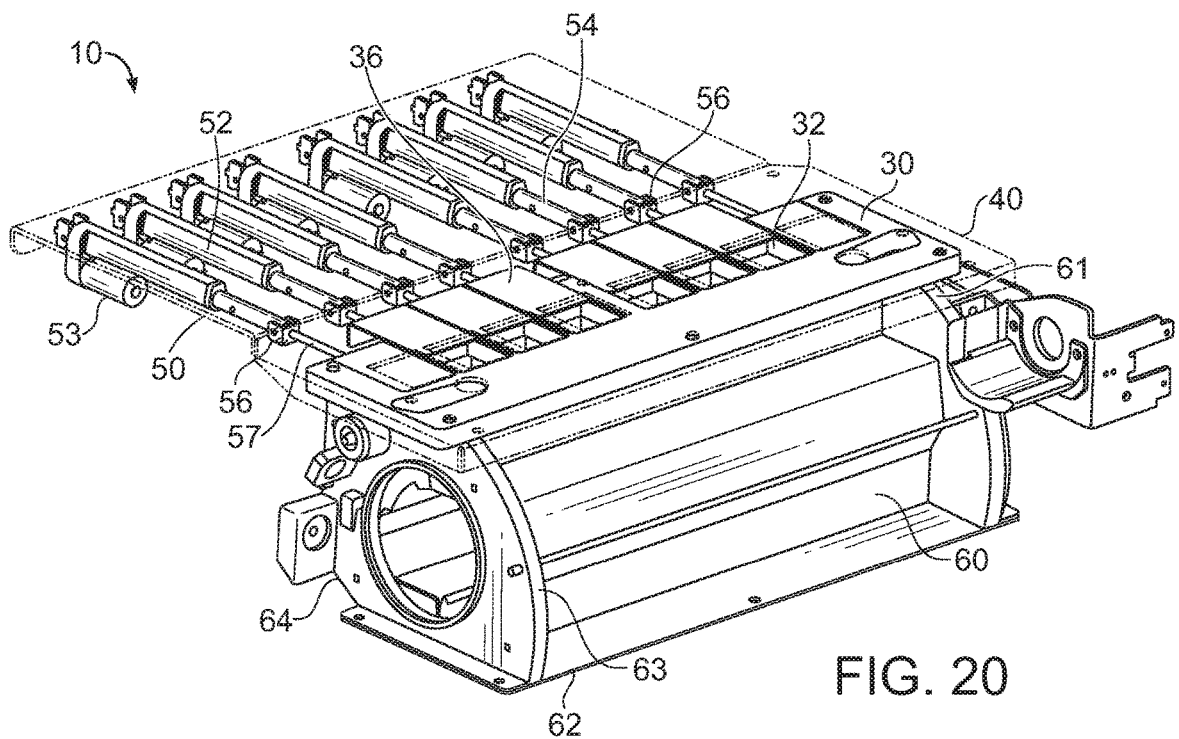
FIG. 20 is a perspective view of a flow control system in accordance with an example embodiment.
Figure 21:
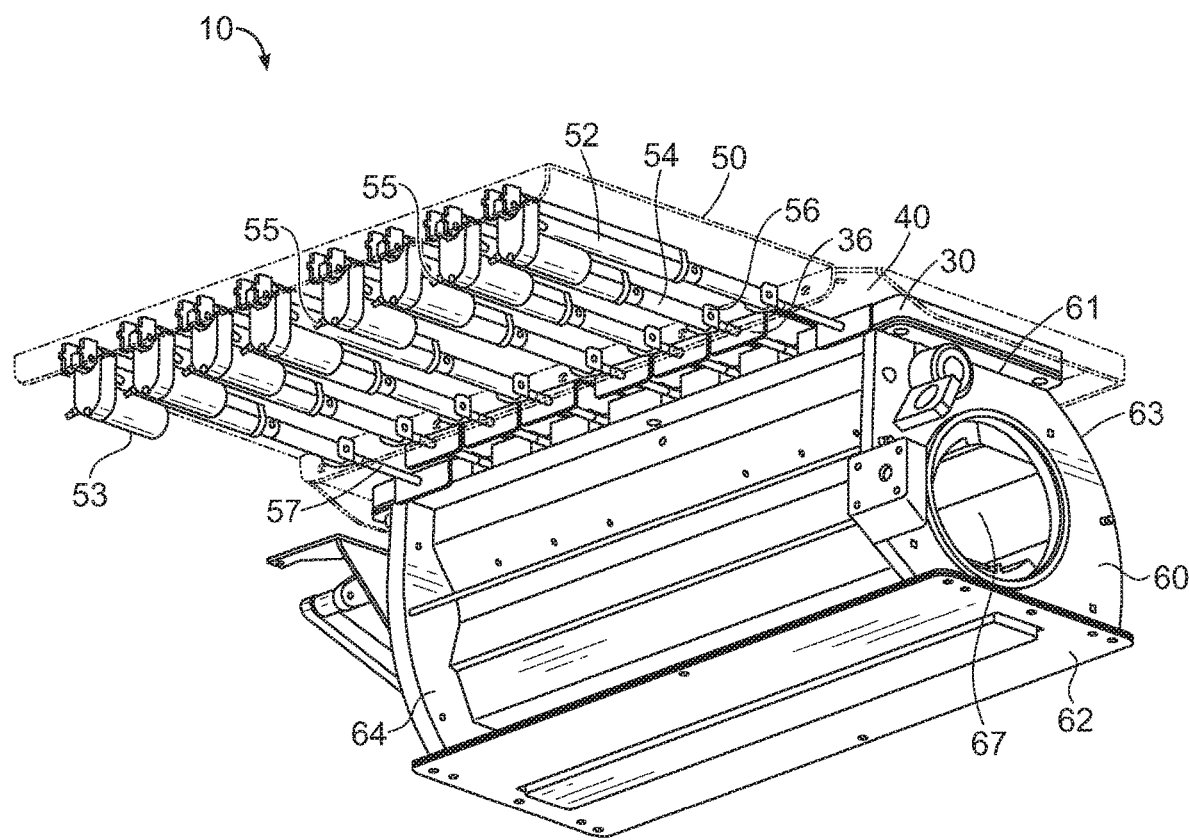
FIG. 21 is a bottom perspective view of a flow control system in accordance with an example embodiment.

The manifold 60 may include an internal chamber as shown in FIGS. 19-21. The internal chamber may be adapted to removably receive a meter unit 68 which is adapted to meter the materials as they are transferred to the outlet 66, conduits 69, and eventually the distributors 18. The flow controller 30 is adapted to control flow of the materials into the meter unit 68 of the manifold 60. The meter unit 68 may be integral with the manifold 60 or may be removably connected as is common in the industry. FIGS. 23 and 24 illustrate an exemplary meter unit 68 inserted within the chamber 67 of a manifold 60. FIGS. 23 and 24 also illustrate interconnection between the conduits 69 and the outlet 66 of the manifold 60.

As shown in FIG. 1, multiple manifolds 60 may be utilized in some embodiments. In FIG. 1, it can be seen that a first tank 13a is connected to a first manifold 60 and a second tank 13b is connected to a second manifold 60. The conduits 69 run through both manifolds 60 such that materials may enter the flow of the conduits 69 from either manifold 60 to be distributed by the distributers 18. In embodiments in which multiple tanks 13a, 13b are utilized for different materials, those materials may be mixed in the conduits 69 before being dispensed by the distributors 18. A pump (not shown) may be utilized to drive air through the conduits 69 and manifolds 60 to convey and mix the materials.

E. Operation of Preferred Embodiment

Figure 22:
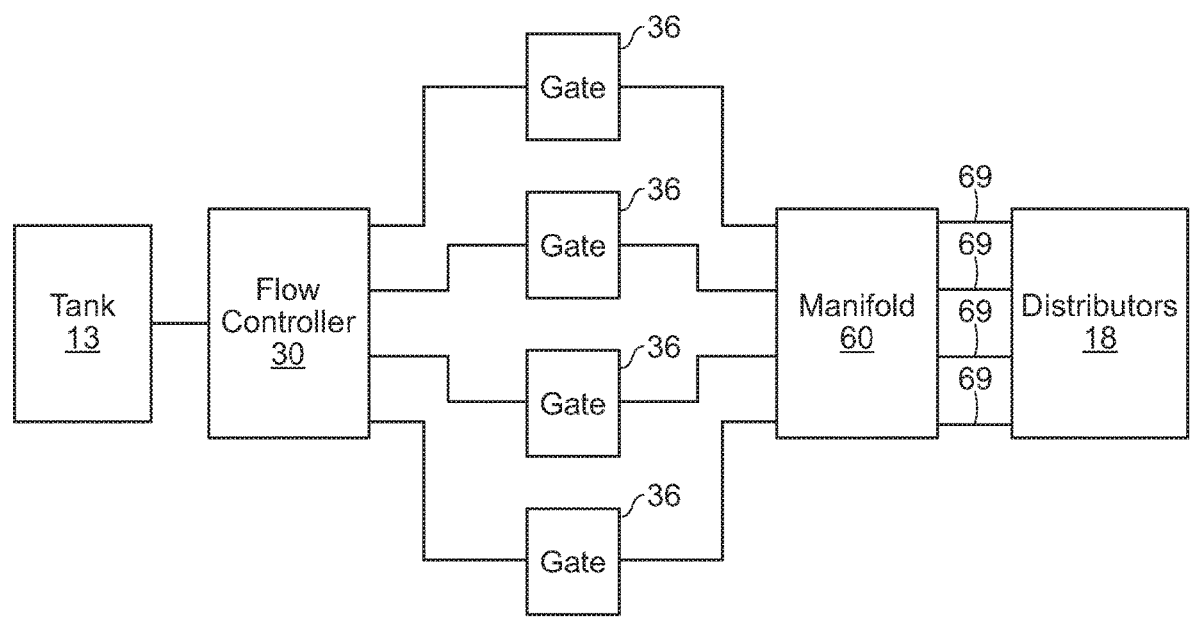
FIG. 22 is a block diagram illustrating a flow control system in accordance with an example embodiment.

FIG. 22 illustrates an exemplary flow control system 10. It should be appreciated that FIG. 22 merely illustrates a simplified, exemplary embodiment of the flow control system 10. It should be appreciated that many embodiments of the flow control system 10 will include more tanks 13, flow controllers 30, gates 36, manifolds 60, or distributors 18.

As shown in FIG. 22, materials start in the tank 13. They are then fed through gravity or pumping to the flow controller 30. The flow of materials through the flow controller 30 will be affected by the state of the gates 36. Closing gates 36 (either manually such as by adjusters 43 or automatically such as by actuators 52) will restrict or inhibit flow through the flow controller 30. Openings gates 36 will allow more of a flow rate.

It can be seen in FIG. 22 that the gates 36 are positioned so as to control flow into the manifold 60. Full flow may be achieved by opening all of the gates 36. Restricted flow may be achieved by closing one, two, or three of the gates 36. Flow may be stopped entirely if desired by closing all of the gates 36. For example, gates 36 may be selectively opened and/or closed to control distribution of a product. If an air seeder 12 has distributors 18 which span a longer length than the area to be seeded, then gates 36 may be selectively closed to inhibit distribution from those sections which cover areas not desired to be seeded, or which were already seeded.

The manner in which the gates 36 are opened or closed may vary in different embodiments. In the embodiment shown in FIGS. 2 and 5, the gates 36 may be grasped directly and pushed or pulled into their desired positions.

In the embodiment shown in FIGS. 6-12, the adjusters 43 may be utilized to control the individual gates 36. By grasping the adjuster 43, such as by its handle, the adjuster 43 may be pushed inwardly such that the corresponding gate 36 covers the corresponding opening 32 to restrict flow through that opening 32. The adjuster 43 may be rotated to engage the lock member 47 within the lock slot 41 so as to lock the gate 36 in its closed position.

When desired, the gate 36 may be pulled away from the corresponding opening 32 so as to allow flow through that opening 32. If locked, the adjuster 43 will first be rotated to disengage the lock member 47 within the lock slot 41 so as to allow the gate 36 to be moved. The adjuster 43 may be grasped, such as by its handle, and pulled outwardly such that the corresponding gate 36 pulls away from and exposes the corresponding opening 32 to allow flow through that opening 32. The adjuster 43 may be rotated to engage the lock member 47 within the lock slot 41 so as to lock the gate 36 in its opened position.

In the embodiment shown in FIGS. 13-21, the actuators 52 may be utilized to adjust the gates 36. The manner of controlling the actuators 52 may vary, but will generally utilize a communicatively interconnected (wired or wireless) controller, such as in the cabin of the vehicle towing the air seeder 12. Alternatively there could be a separate control box on the air seeder 12 near the tanks 13.

When an actuator 52 is extended, the shaft 54 will extend outwardly from the base 53 of the actuator 52. As the shaft 54 moves outwardly, the linkage 57 and connected gate 36 will similarly move. The actuator 52 may be configured such that it will automatically extend the distance necessary to cover the opening 32 with the gate 36 upon pressing a single button. In other embodiments, the actuator 52 may be adjustable to a wide range of positions, including a position in which the gate 36 only partially covers the corresponding opening 32 on the flow controller 30. Generally, lock members 47 will not be necessary to hold the gate 36 in position, as the actuator 52 will remain fixed until retracted.

When an actuator 52 is retracted, the shaft 54 will retract inwardly toward the base 53 of the actuator 52. As the shaft 54 moves inwardly, the linkage 57 and connected gate 36 will similarly move. The gate 36 may automatically move a distance such that the opening 32 of the flow controller 30 is fully exposed. In other embodiments, the gate 36 may be retracted to only partially expose the corresponding opening 32 in the flow controller 30.

FIGS. 8-11 illustrate various combinations of opened/closed gates 36; with FIG. 10 illustrating all gates 36 opened to allow full flow. FIGS. 15-18 also show various combinations of opened/closed gates 36; with FIG. 17 illustrating all gates 36 opened to allow full flow. It should be appreciated that any combination of closed/opened gates 36 may be utilized to meet the needs of the operator of the flow control system 10.

As shown in FIG. 22, materials will enter the manifold 60 via its inlet 65; with the flow of materials being controlled by the opened/closed gates 36 of the flow controller 30. These materials will then generally enter the meter unit 68 within the manifold 60; which will meter the materials before they exit the outlet 66 of the manifold 60. The materials may then be transferred to the distributors 18, such as disc or tine seeders, via one or more conduits 69.

Unless otherwise defined, all technical and scientific terms used herein have the same meaning as commonly understood by one of ordinary skill in the art to which this invention belongs. Although methods and materials similar to or equivalent to those described herein can be used in the practice or testing of the flow control system, suitable methods and materials are described above. All publications, patent applications, patents, and other references mentioned herein are incorporated by reference in their entirety to the extent allowed by applicable law and regulations. The flow control system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A flow control system, comprising:
   a manifold including an inlet, an outlet, and a meter unit, wherein the inlet of the manifold is adapted to be fluidly connected to a volume of a material, wherein the outlet of the manifold is adapted to be fluidly connected to one or more distributors;
   a flow controller connected to the manifold so as to control a flow of the material entering the meter unit, wherein the flow controller comprises a plurality of openings which are fluidly connected with the inlet of the manifold and a plurality of gates, wherein each of the plurality of gates is movable so as to selectively cover one or more of the openings of the flow controller, wherein each of the plurality of gates is adapted to selectively restrict flow of the material into the meter unit, and wherein each of the gates is adapted to be manually adjusted;

a plurality of rods, wherein each of the plurality of rods is connected to one or more of the plurality of gates, wherein each of the plurality of rods is operable to push one or more of the plurality of gates into a closed position, wherein each of the plurality of rods is operable to pull one or more of the plurality of gates into an opened position, wherein in the closed position one or more of the plurality of gates fully restricts flow of the material through one or more of the plurality of openings; and a cover connected to the flow controller, wherein the cover is connected to an upper end of the flow controller and wherein the cover comprises a flange including a plurality of lock slots;

wherein each of the plurality of rods comprises a lock member adapted to selectively engage with one of the lock slots to removably lock each of the plurality of rods in position.

2. The flow control system of claim 1, wherein movement of each of the plurality of gates is adapted to be individually controlled.

3. The flow control system of claim 1, further comprising a hopper connected between the inlet of the manifold and the volume of the material.

4. The flow control system of claim 1, wherein the material comprises seeds.

5. The flow control system of claim 1, wherein each of the plurality of rods comprises a lock member adapted to removably lock one or more of the plurality of gates into the closed position or the opened position.

* * * * *